May 12, 1964 A. SCHWARZBERGER Re. 25,575

FOLLOWER UNITS FOR QUILTING MACHINES

Original Filed Jan. 5, 1960 4 Sheets-Sheet 1

INVENTOR:
ARTHUR SCHWARZBERGER
BY
Stevens & Batchelor
ATTORNEYS.

FOLLOWER UNITS FOR QUILTING MACHINES

Original Filed Jan. 5, 1960 4 Sheets-Sheet 2

INVENTOR:
ARTHUR SCHWARZBERGER
BY
Stevens & Bartholer
ATTORNEYS.

FOLLOWER UNITS FOR QUILTING MACHINES

Original Filed Jan. 5, 1960 4 Sheets-Sheet 3

INVENTOR:
ARTHUR SCHWARZBERGER
BY
Stevens & Batchelor
ATTORNEYS.

FOLLOWER UNITS FOR QUILTING MACHINES
Original Filed Jan. 5, 1960 4 Sheets-Sheet 4
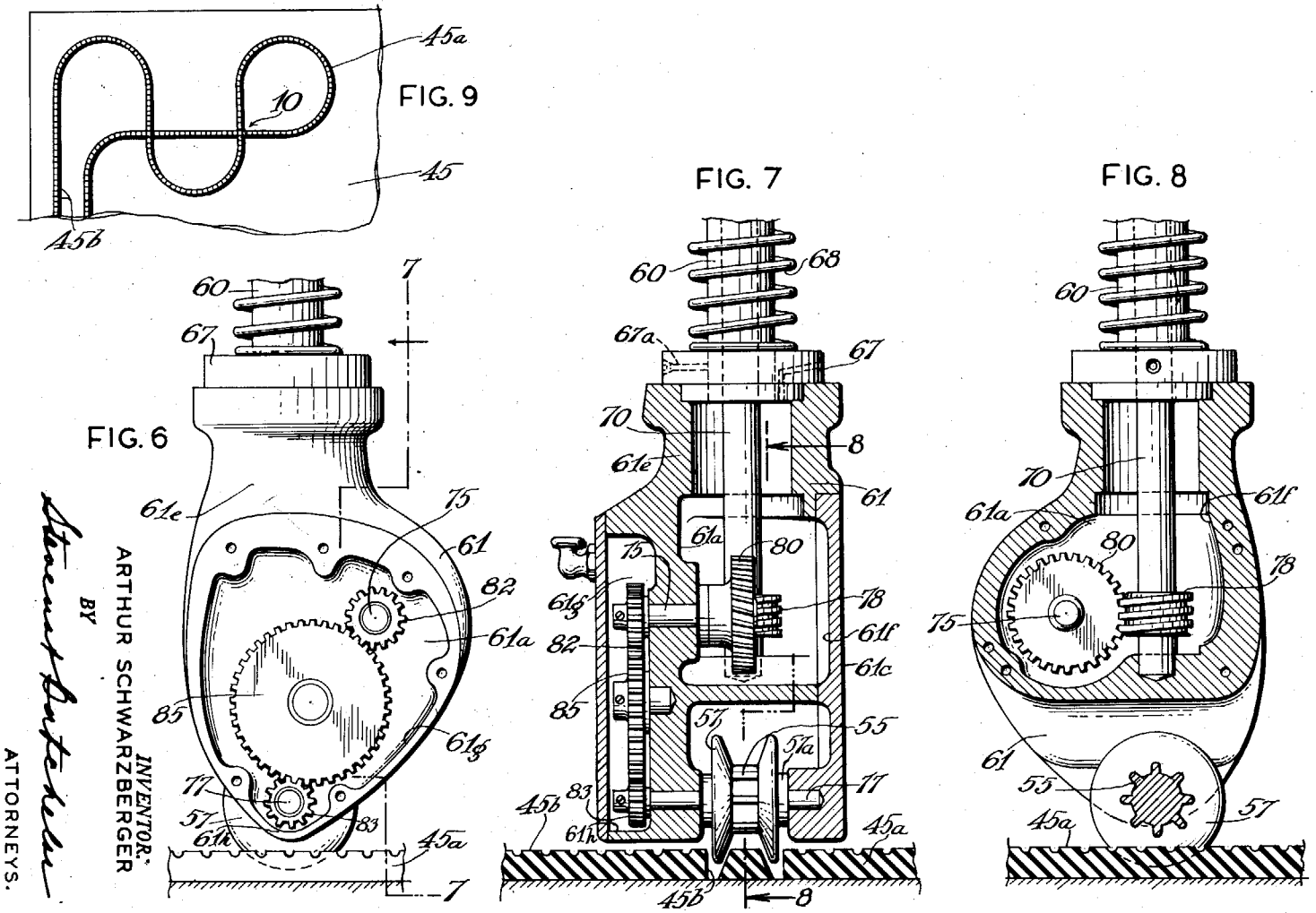
INVENTOR:
ARTHUR SCHWARZBERGER
BY
Stevens & Davis
ATTORNEYS.

United States Patent Office

Re. 25,575
Reissued May 12, 1964

25,575

FOLLOWER UNITS FOR QUILTING MACHINES

Arthur Schwarzberger, Chicago, Ill., assignor to Shirley Schwarzberger, Chicago, Ill.

Original No. 3,046,921, dated July 31, 1962, Ser. No. 548, Jan. 5, 1960. Application for reissue Mar. 11, 1963, Ser. No. 244,542
7 Claims. (Cl. 112—118)

Matter enclosed in heavy brackets [ ] appears in the original patent but forms no part of this reissue specification; matter printed in italics indicates the additions made by reissue.

My invention relates to machines which stitch quilting lines in assembled layers of textile materials in conformity with a base pattern, and more particularly to the follower unit for such pattern. The latter is usually a network of V-belt material secured on a flat base; and the conventional follower unit employs guides which track along the sides of the V-belt and are geared to assume a differential action when the follower rounds a pattern curve. The smooth tracking of the follower often causes it to drag and lose traction, so that it takes considerably longer to accomplish the stitching operation. Also, the spread of the guides prevents the follower from conforming to turns of less than a 3-inch radius in the pattern. Further, the conventional quilting machines carry the pattern in one of the movable frames of the machine. When it is considered that some patterns weigh as much as 400 or 500 pounds, it will be realized that the conventional power drive for the movable frame will operate under a considerable strain. In fact, where a carrier, as mounted in the bridge frame of the machine, is subject to the strain referred to, it imposes a vibrating influence on the bridge frame which causes the stitching needle to break.

The novel follower unit and its environment have been designed to eliminate the above deficiencies. Thus, one object of the present invention is to provide a follower unit which employs a gear-type roller for application to the top of the pattern track, such top being ribbed to mesh with the roller and eliminate all slippage and drag from the travel of the follower unit.

Another object is to confine the engagement of the follower with the track to the point where the roller engages the top of the track, so that the follower may conform to track curves of as small a radius as 1¼ inch and meet no hindrance in this respect.

A further object is to mount the follower unit for tracking engagement at floor level, so that the pattern, whatever its size or weight may be, will rest on the floor clear of the machine frame and impose no strain on any part of the machine.

An additional object is to construct the follower in a manner to both confine its path to the course of the pattern track and have the freedom of crossing the pattern meshes where one track intersects another.

With the above objects in view, a better understanding of the invention may be had by reference to the accompanying drawings, in which:

FIG. 6 is a further enlarged duplication of the lower portion of FIG. 4, as the follower is about to engage the pattern track, and showing a cover removed from a housing to reveal the interior thereof;

FIG. 7 is a section on the line 7—7 of FIG. 6;

FIG. 8 is a section on the line 8—8 of FIG. 7;

FIG. 9 is an enlarged view of a fragment of the pattern; and

Figure 1:
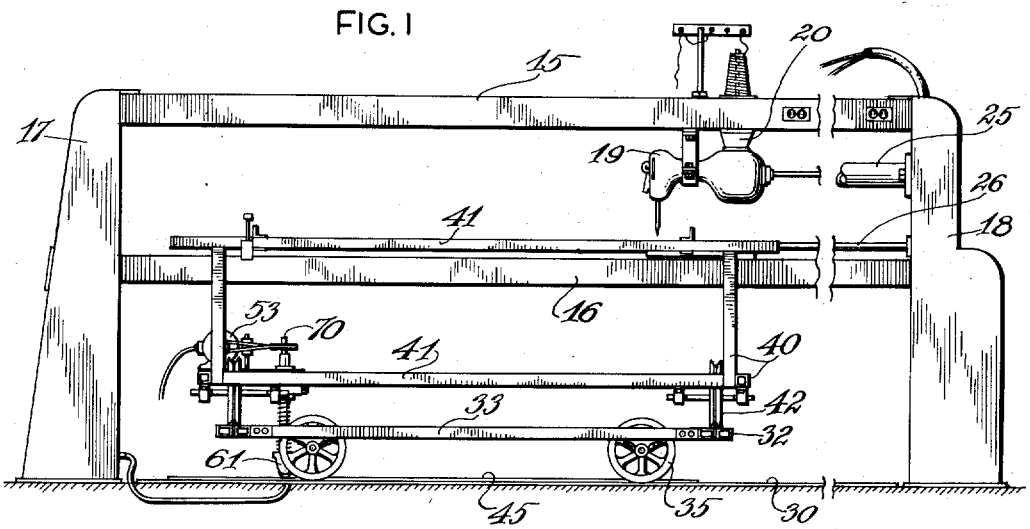
FIG. 1 is a front elevation of the quilting machine, showing the position of the follower unit.
Figure 4:
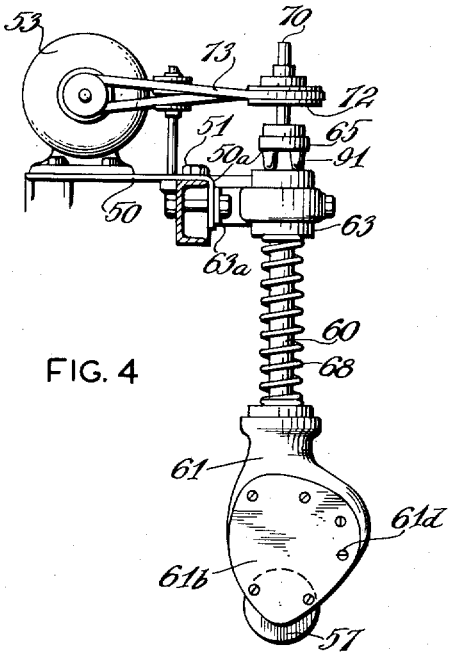
FIG. 4 is an enlarged section on the line 4—4 of FIG. 3.
Figure 5:
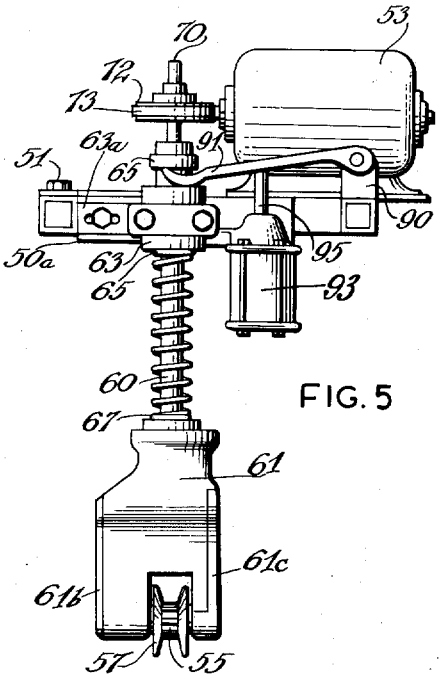
FIG. 5 is a view from the right-hand side of FIG. 4.
Figure 2:
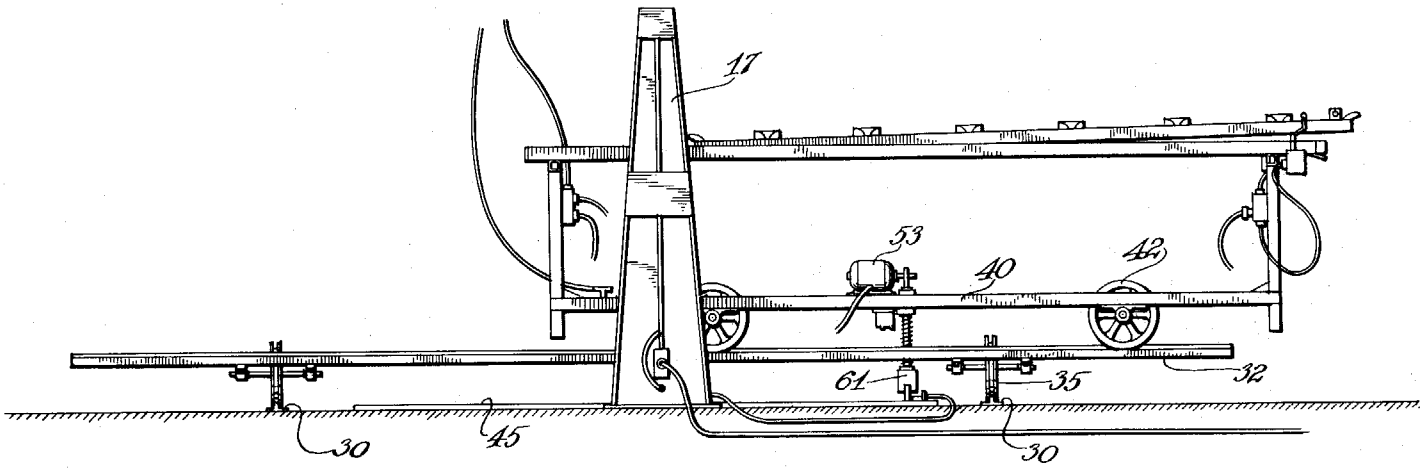
FIG. 2 is an elevation from the left-hand side of FIG. 1.

Referring specifically to the drawings, 15 denotes the top bar, 16 the lower bar, 17 the left-hand supporting post, and 18 the right-hand supporting post of the bridge frame which carries the sewing machine 19 by means of suspension brackets 20. The power drive to the head of the sewing machine is carried in a tubular housing 25, while that to the base of the sewing machine is carried in a similar housing 26, these housing extending from the supporting post 18 of the bridge frame.

Figure 3:
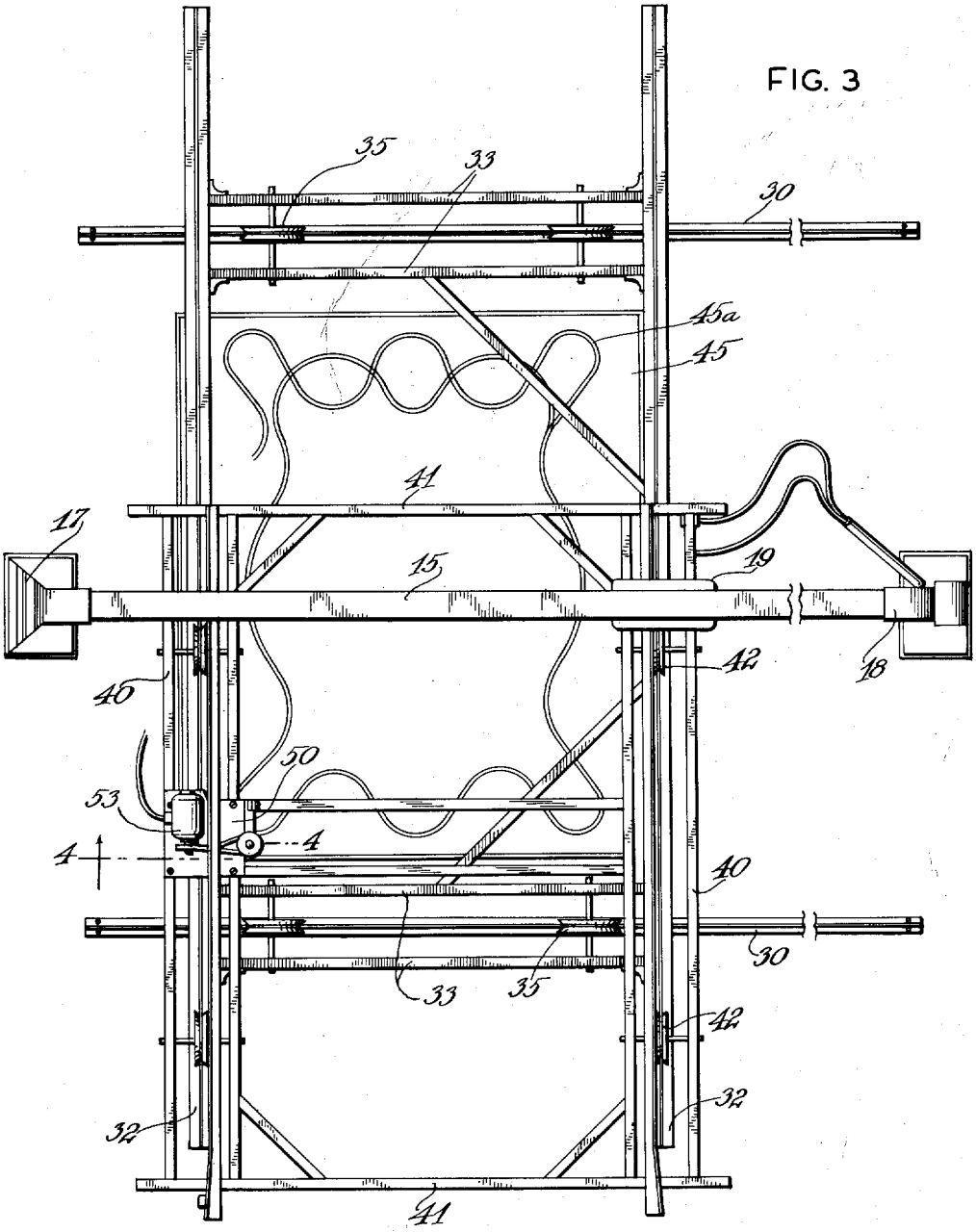
FIG. 3 is a top plan view.

FIG. 3 shows a pair of floor rails 30 extending along the front and rear of the bridge frame 15, respectively. These rails are secured to the floor of the space occupied by the machine, and are designed to form a track for the travel of a frame 32 in the lower part of the machine from side to side in the space between the posts 17 and 18. The frame 32 is formed with cross-bar 33, and carries wheels 35 which ride on the rails 30.

The side bars of the frame 32 are also formed to serve as a track for an upper frame 40 whose travel is crosswise of the track rails 30, that is, between front and rear positions. The frame 40 also has cross-bars 41, and carries wheels 42 which ride on the side bars of the frame 32.

Mounted as described, the upper frame 40 may not only be moved forth and back, but from side to side with the lower frame 32, as the latter rides the track rails 30. This permits any object on the frame 40 to be carried in any lateral direction, such as to follow the meshes of a quilting pattern 45. The latter, which may be of wood or metal, rests on the floor between the rails 30, and the frame 40 carries a follower unit which depends into tracking contact with the strip detail 45a of the pattern. As seen in FIG. 7, the strip 45a has the cross-section of a V-belt, and is made of rubber; and the narrow surface of the strip is the top one.

Figure 10:
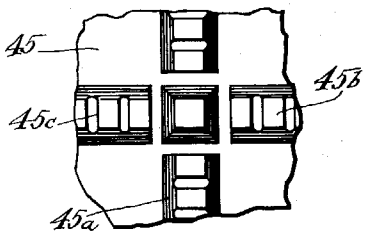
FIG. 10 is an enlargement of a crossing area indicated at 10 in FIG. 9.

The follower unit originates with a horizontal plate 50 which is bolted at 51 to the upper traveling frame 40, and carries an electric motor 53. The follower which rides the strip 45a is a gear wheel 55; and the strip is formed with cross-teeth 45b with which the teeth of the gear wheel mesh as it travels over the pattern strip. FIG. 7 shows that the gear wheel receives guard discs 57 at the sides to confine the course of the gear wheel to that of the pattern strip. Where one strip crosses another, FIGS. 7 and 10 show that the strip is deeply grooved at 45c on four sides in order to permit the crossing travel of the guard discs 57.

The follower unit consists primarily of a vertical tube 60 and a housing 61 at the bottom of the same. The tube rises slidably through a pillow block 63 which has side flanges 63a for securing the pillow block to a downflange 50a of the plate 50. The journaled disposal of the tube 60 in the pillow block permits the housing 61 to turn about the axis of the tube as the gear wheel 55—which is carried by the housing—follows the course of the pattern. The tube 60 carries a collar 65 at the top, and a collar 67 just above the housing. A compression spring 68 is coiled around the tube between the pillow block and the collar 67. The latter is slidable on the tube and adapted to be fixed by a set screw 67a. Thus, the follower unit rests by its own weight on the pattern. Should high points or hurdles occur along the pattern, the spring 68 will yield to the rise of the housing 61. Should it be necessary to increase the tension of the spring, the collar 67 may be set at a higher point than shown. It follows now that the regular function of the spring 68 is to maintain the gear wheel in engagement with the pattern under a suitable degree of pressure.

The function of the motor 53 is to drive the gear wheel 55. Thus, a vertical shaft 70 is journaled inside the tube 60, the shaft rising from the same to receive a pulley 72.

A drive belt 73 extends from the motor to the pulley 72. The housing 61 is a heavy casting open at the sides and formed with an internal partition 61a; and cover plates 61b and 61c are applied to the sides of the housing and secured by screws 61d.

The upper part of the housing 61 journals a cross-shaft 75, while the lower part journals a similar shaft 77. The housing is formed with a neck 61e at the top through which the shaft 70 descends to terminate with a worm 78. A pinion 80 carried by the cross-shaft 75 is in mesh with the worm 78. This occurs in the larger compartment 61f of the housing; and the cross-shaft 75 extends into the smaller compartment 61g to carry a spur pinion 82. The lower cross-shaft 77 also extends into the compartment 61g to carry a spur pinion 83; and an idler gear 85 is journaled on a short cross-shaft in the compartment 61g to mesh with the spur pinions 82 and 83. The compartment 61g is closed at the bottom, as indicated at 61h, to protect the gearing therein from foreign matter and make possible the retention of a gear lubricant in the compartment 61g. The compartment 61f has a closure below the worm drive, but is necessarily open at the bottom to expose the gear wheel 55 for engagement with the pattern. The gear wheel is of course tightly mounted on the shaft 77, while the guard discs 57 are free to turn on such shaft, and have outward hubs 57a to fill the spaces between the discs and the adjoining sections of the housing.

The plate 50 also carries an upstanding bracket 90 for pivoting a fork 91 which extends to straddle the tube 60 underneath the collar 65. An air valve 93 has a lifter 95 for the fork 91 in order to raise the follower unit clear of the pattern when the machine is not in use. The raising feature is also used when the frames 40 and 32 are to be wheeled to one side for access to the sewing machine in case its needle breaks or some repair to it is necessary. Thus, the pattern or other floor projections will not be in the way of the follower unit as the frames are wheeled back of the zone of approach. FIGS. 6 to 8 show the follower slightly raised.

The switches and other controls are carried in the right-hand post 18 of the machine. The motor is designed to be shut off just before the sewing machine, and through the agency of an inherent quick-stop brake for the motor shaft. Thus, a strain is not put on the sewing machine, and the same may take a few final stitches and do some final tacking before the sewing machine stops.

It is now apparent that the novel follower unit is controllable to lift and lower it in relation to the pattern, and to stop instantly and without damage to the sewing machine needle. Further, the unit is free to follow the course of the pattern while securing positive traction with the same by the use of a gear wheel in mesh with the pattern strip. Further, the mechanism for driving the gear wheel is mostly concentrated in the bottom housing of the follower unit, where it adds its own weight of that of the massive housing in order to keep most of the weight of the follower unit at the bottom for reliable tracking engagement with the pattern. Further, the follower is spring-backed for surmounting irregularities in the pattern without shock to the gear wheel drive. Further, the gear wheel is quite simple, since it only meets the top of the pattern strip; and the freely-journaled guard discs serve both to keep the gear wheel in track-engaging alinement and to thread through the crossing grooves. *Further, the positive drive obtained by the gear wheel and the pattern track is especially important where gaps occur at track crossings, as noted in FIGURE 10. Where an un-toothed or plain wheel would lose traction crossing a gap, the present gear wheel remains in mesh as it crosses the gap, maintaining its positive traction over crossing.* Finally, the follower unit is compactly grouped with the top plate, facilitating its complete separation from the machine in case a major repair or overhauling is necessary.

While I have described the invention along specific lines, various minor changes or refinements may be made therein without departing from its principle, and I reserve the right to employ all such changes and refinements as may come without the scope and spirit of the appended claims.

I claim:

1. In a quilting machine or the like, the combination with a carrier, and a linear pattern below the same; of a follower supported by the carrier, the follower including a gear wheel having relatively straight peripheral teeth directed for rolling engagement with the pattern, said pattern including a relatively low gear-rack profile on the upper surface thereof for meshing engagement and positive traction with said gear teeth, the pattern including relatively straight sides; said follower including horizontal shaft means upon which said gear wheel is mounted, and individual guard discs journalled for free rotation on said shaft means alongside said gear wheel for traveling along said pattern sides when said gear wheel is rotated.

2. The structure of claim 1 wherein said pattern comprises a network of strips some of which intersect and cross each other, said intersecting portions of said strips having groove portions therebetween for permitting said discs to pass therethrough as said gear wheel moves over the intersection of said strips.

3. The structure of claim 1 including resilient means engaged with said follower and normally urging said follower into engagement with said pattern.

4. The structure of claim 1 wherein said follower comprises a housing including upper, side and lower compartments, a drive shaft projecting into said upper compartment, a second drive shaft projecting laterally from said upper compartment into said side compartment and drivingly connected to said first mentioned drive shaft, a gear train connected to said second drive shaft and disposed within said side compartment, said horizontal shaft means projecting into said side compartment and drivingly connected to said gear train.

*5. In a quilting machine or the like, the combination with a carrier, and a linear pattern for directing the carrier; of a follower for moving the carrier as directed by the pattern, said follower having a gear wheel with teeth directed for engagement with the pattern, guards at the sides of the gear wheel, said pattern having a rack profile with side walls for meshing and guiding engagement with said gear wheel and guards, and at least one of said side guards being rotatable relative to said gear wheel to confine the course of the gear wheel to that of the side walls of the pattern rack profile, and means for driving said gear wheel to shift the carrier for following the rack profile of the pattern.*

*6. The structure as claimed in claim 5 in which said follower includes enclosed compartment means housing said means for driving said gear wheel, said last-mentioned means including a drive shaft means drivingly connected to a gear train, said compartment means completely enclosing said gear train for protecting the same against the entry of foreign matter.*

*7. The structure as claimed in claim 5 in which said follower includes a housing having completely enclosed upper and side compartments, and a downwardly opening portion, said drive shaft means comprising a first drive shaft projecting into said upper compartment, a second drive shaft drivingly connected to said first drive shaft and extending into said side compartment, a gear train mounted in said side compartment and drivingly connected to said second drive shaft, and horizontal shaft means journaled in said housing and drivingly connected to said gear train, said gear wheel being mounted on said horizontal shaft means.*

(References on following page)

References Cited in the file of this patent or the original patent

UNITED STATES PATENTS

| | | |
|---|---|---|
| 1,329,411 | Kanta et al. | Feb. 3, 1920 |
| 1,997,779 | Miller | Apr. 16, 1935 |
| 2,119,341 | Milner | May 31, 1938 |
| 2,152,819 | Rothchild | Apr. 4, 1939 |
| 2,236,421 | Boettcher | Mar. 25, 1941 |
| 2,279,628 | Marsack | Apr. 14, 1942 |
| 2,395,653 | Attwood | Feb. 26, 1946 |
| 2,410,240 | Schlicksupp | Oct. 29, 1946 |
| 2,501,239 | Schwartz | Mar. 21, 1950 |
| 2,609,769 | Kramer et al. | Sept. 9, 1952 |
| 2,735,313 | Dickson | Feb. 21, 1956 |

FOREIGN PATENTS

| | | |
|---|---|---|
| 631,137 | Great Britain | Oct. 27, 1949 |
| 908,154 | Great Britain | Oct. 17, 1962 |